(12) United States Patent
Peredereeva et al.

(10) Patent No.: US 8,435,701 B2
(45) Date of Patent: May 7, 2013

(54) HOLOGRAPHIC RECORDING MEDIUM

(75) Inventors: Svetlana Peredereeva, Quebec (CA);
Orza Pouraghajani, Quebec (CA);
Rouslan Birabassov, Quebec (CA);
Nariman Ashurbekov, Quebec (CA)

(73) Assignee: Southbourne Investments Ltd.,
Channel Island, Jersey (GB)

( * ) Notice: Subject to any disclaimer, the term of this patent is extended or adjusted under 35 U.S.C. 154(b) by 85 days.

(21) Appl. No.: 12/745,241

(22) PCT Filed: Nov. 27, 2008

(86) PCT No.: PCT/CA2008/002050
§ 371 (c)(1),
(2), (4) Date: Oct. 22, 2010

(87) PCT Pub. No.: WO2009/067788
PCT Pub. Date: Jun. 4, 2009

(65) Prior Publication Data
US 2011/0027697 A1    Feb. 3, 2011

Related U.S. Application Data

(60) Provisional application No. 60/990,565, filed on Nov. 27, 2007.

(51) Int. Cl.
*G03H 1/02*    (2006.01)

(52) U.S. Cl.
USPC ............................ 430/1; 430/2; 359/3

(58) Field of Classification Search .................. None
See application file for complete search history.

(56) References Cited

U.S. PATENT DOCUMENTS

| | | | | |
|---|---|---|---|---|
| 2,927,022 A | * | 3/1960 | Martin et al. | 430/281.1 |
| 3,380,831 A | * | 4/1968 | Cohen et al. | 430/288.1 |
| 3,658,526 A | * | 4/1972 | Haugh | 430/1 |
| 3,667,946 A | * | 6/1972 | Sturdevant | 430/1 |
| 3,694,218 A | * | 9/1972 | Margerum | 430/1 |
| 4,942,112 A | * | 7/1990 | Monroe et al. | 430/282.1 |
| 5,260,149 A | * | 11/1993 | Monroe et al. | 430/1 |
| 6,165,648 A | * | 12/2000 | Colvin et al. | 430/1 |
| 2005/0059543 A1 | * | 3/2005 | Kolb et al. | 502/168 |
| 2005/0208431 A1 | * | 9/2005 | Devoe et al. | 430/321 |
| 2008/0241706 A1 | | 10/2008 | Li et al. | |

FOREIGN PATENT DOCUMENTS

| | | |
|---|---|---|
| JP | 11-133841 | 5/1999 |
| WO | 2008/047095 | * 4/2008 |

OTHER PUBLICATIONS

Waldman et al. "Cationic ring opening photopolymerization methods for volume hologram recording", Proc. SPIE 2689 pp. 127-141 (1996).*
Sartomer Oligomer selection guide 18 pages (1997).*
Shilling, M.L., et al,; "Acrylte Oligomer-Based Photopolymers for Optical Storage Applications"—Chem. Mater., 1999, 11, 247-254.

* cited by examiner

*Primary Examiner* — Martin Angebranndt
(74) *Attorney, Agent, or Firm* — Wilson, Sonsini, Goodrich & Rosati

(57) ABSTRACT

A composition for holographic recording is provided, comprising an inert polyphenyl ether binder capable of supporting radical polymerization, wherein the inert binder is substantially transparent in visible light, and is viscous at room temperature; a photopolymerizable part comprising a matrix forming component comprising at least one radically photopolymerizable multifunctional (meth)acrylic oligomer or monomer, and a radically polymerizable recording component; and a photoinitiation system capable of initiating radical polymerization.

18 Claims, 2 Drawing Sheets

HOLOGRAPHIC RECORDING MEDIUM

FIELD OF THE INVENTION

The invention is related to holographic recording media and to compositions suitable for use therein.

BACKGROUND OF THE INVENTION

In a holographic recording medium, holograms (known also as gratings) are recorded from the interference of signal and reference beams within a photosensitive medium. A medium for holographic applications should be capable of recording the spatial intensity variation as refractive index modulation throughout the volume. A number of factors determine the hologram's strength and performance including a combination of: the refractive index modulation or fringe contrast; the thickness of the medium; and the optical losses resulting from scattering and absorption within the medium. In order to address the needs of holographic systems (for example, holographic filters, holographic data storage, holographic lenses) the thickness of the photosensitive medium must generally be 200 µm or greater. Such media are generally termed 'thick media', and should exhibit low scattering, high recording sensitivity, stable image fidelity, low volume shrinkage and high dynamic range.

The photopolymers in one class that has been studied comprise a homogenous mixture of a polymeric binder and at least one photopolymerizable monomer and/or oligomer. The holograms are created by component segregation (through diffusion of monomers) and local photo-polymerization of one or more components. These interference fringes create regions of low and high refractive index, and it is desirable to maximize this difference to maximize fringe contrast. However, practical limits to the available refractive index contrast will be established by other related parameters that define the overall optical performance of the media. For example, one of these considerations, reliability, is impacted strongly by the degree of component segregation in making up the fringe. Consequently, the choice of components such as the binder for use in this medium requires more consideration than just the refractive index difference.

Colvin et al., in U.S. Pat. No. 6,165,648, developed a medium containing photopolymerizable acrylate oligomers without an inert component. This material is based on free-radical polymerization and it contains low molecular weight monomers, for example isobornyl acrylate, and has low sensitivity because of the high cross-link density of the polymer network. The dense state of the polymer impedes diffusion of recording monomers lowering photosensitivity and dynamic range.

The prior art discloses the use of solvents either as a neutral binder [W. J. Tomlinson et al., Multicomponent photopolymer system for volume phase holograms and grating devices, *Appl. Opt.*, vol. 15(2), pp. 534-541, 1976] or as an inert component [T. Smirnova et al., "The effect of structural-kinetic features of hologram formation on holographic properties of photopolymers", *Semiconductor Physics, Quantum Electronics Optoelectronics*, 2004, v. 7, n. 3, pp. 326-331] in combination with photopolymerizable oligomers or monomers to form a holographic medium. In this context the inert component is not involved in the polymerization reaction, but may perform some other function such as maintaining compatibility, modifying reaction rates, or engineering a specific refractive index in the medium. However, photopolymer systems containing solvents can show temperature instability and have high light scattering making them unacceptable for preparation of thick holographic medium. The solvents disclosed by Smirnova have a low boiling point and low molecular weight that leads to temperature instabilities and the formation of droplets with sizes larger than the recording wavelength. These solvents also have high coefficients of thermal expansion (CTE $\sim 10^{-3}/°$ C.) that can significantly reduce reliability of the media.

Cetin et al., in U.S. Pat. Nos. 6,784,300 and 7,070,886, developed a holographic medium based on a non-volatile and viscous inert oligomeric binder mixed with cationic photopolymerizable monomers/oligomers. These cationic ring opening polymerization (CROP) systems have relatively high sensitivity, high dynamic range and low shrinkage because volume change is compensated by opening of the epoxy ring during holographic recording. However, it is known that photo-initiated cationic polymerization has a relatively low polymerization rate compared to very reactive radical photopolymerizable acrylic systems (Berlin) and that there are disadvantages in that the holographic optical medium stability before exposure is poor and the recording speed depends greatly on temperature [C. Decker, K. Moussa, *Journal of Polymer Science: Part A: Polymer Chemistry*, vol. 28, pp. 3429-3443 (1990)].

Therefore, a need still exists for holographic recording media that exhibit high performance and reliability when formed in layers of about 200 µm and greater.

SUMMARY OF THE INVENTION

An object of the present invention is to provide a holographic recording medium. In accordance with an aspect of the present invention, there is provided a composition for holographic recording comprising an inert polyphenyl ether binder capable of supporting radical polymerization, wherein the inert binder is substantially transparent in visible light, and is viscous at room temperature; a photopolymerizable part comprising a matrix forming component comprising at least one radically photopolymerizable multifunctional (meth)acrylic oligomer or monomer, and a recording component comprising a radically polymerizable recording component; and a photoinitiation system capable of initiating radical polymerization. The composition also optionally comprises at least one polymerization retarder or polymerization inhibitor.

In accordance with one embodiment of the invention, the matrix forming component comprises a multifunctional (meth)acrylic oligomer or monomer having an acrylate equivalent weight (AEW) greater than or equal to 600 g/mol, wherein the number of functional groups is at least 2, and the recording component comprises a radically polymerizable mono- or difunctional (meth)acrylic and/or oligomer having a functional equivalent weight (EW) of less than or equal to about 500 g/mol.

In accordance with one embodiment of the invention, the matrix forming component comprises a multifunctional (meth)acrylic oligomer and/or monomer, having an average acrylate equivalent weight of from about 600 g/mol to about 1,500 g/mol, and the recording component comprises a radically polymerizable mono- or difunctional recording monomer having a functional equivalent weight (EW) of less than or equal to about 500 g/mol.

In accordance with another aspect of the invention, there is provided a holographic recording medium comprising an active photopolymer layer comprising the composition of the present invention, wherein the photopolymer layer is embraced by supporting glass or polymer plates, wherein at least one of the glass or polymer plates is transparent to visible light. In one embodiment, the active photopolymer layer has a thickness of at least about 200 microns.

In accordance with another aspect of the invention, there is provided a process for preparing a medium suitable for hologram recording, comprising the steps of combining an inert polyphenyl ether binder capable of supporting radical polymerization, wherein the inert binder is substantially transparent in visible light, and is viscous at room temperature; a photopolymerizable part comprising a matrix forming component comprising at least one radically photopolymerizable multifunctional (meth)acrylic oligomer or monomer, and a recording component comprising a radically polymerizable mono- and/or difunctional recording monomer; and a photoinitiation system capable of initiating radical polymerization to obtain a reaction mixture; and exposing the resulting reaction mixture to a non-coherent photoinitiating light source to initiate matrix formation. In one embodiment, the reaction mixture of step a) additionally comprises a polymerization retarder or a polymerization inhibitor.

DETAILED DESCRIPTION OF THE INVENTION

Figure 1:
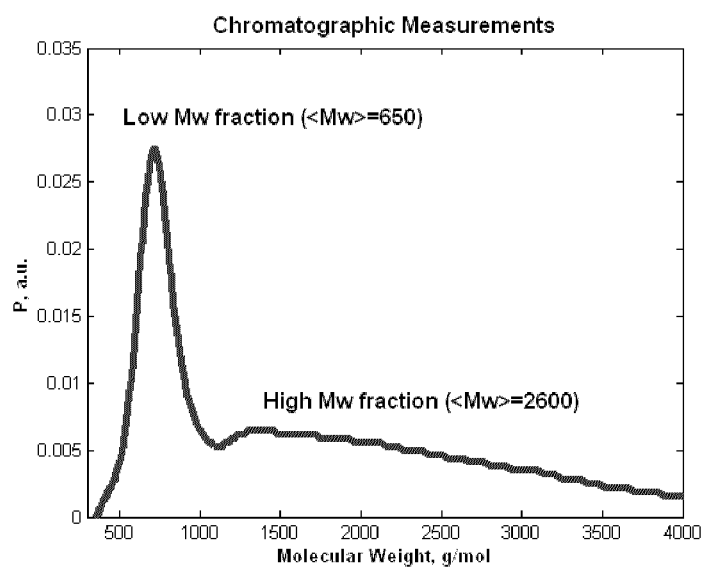
FIG. 1 shows the molecular weight distribution of the urethane acrylate CN964, as determined by size exclusion chromatography.

It has been found that viscous inert oligomeric polyphenyl ether binders are suitable for use in optical recording materials. In accordance with the present invention, such binders are used in combination with radically photopolymerizable (meth)acrylate monomers or oligomers and a suitable radically photopolymerizable mono- or difunctional recording component to provide a holographic recording medium having the following characteristics: low light scattering, high recording sensitivity, stable image fidelity, low volume shrinkage and high dynamic range. The present invention therefore provides a composition suitable for recording holograms, comprising a matrix forming component comprising one or more radically photopolymerizable multifunctional (meth)acrylic oligomer/monomers, which are substantially consumed for polymer network creation (three-dimensional cross-linking structure, referred herein as a matrix), and a mono- or difunctional recording component which is substantially consumed for hologram recording.

Matrix formation and hologram recording are done in two different steps. First, the matrix is created when the composition is exposed to uniform (over the medium surface) non-coherent photoinitiating light source with minimum energy sufficient to create the matrix from the matrix forming component, while the recording component is not substantially polymerized. After the matrix preparation, the recording component is substantially consumed during the hologram recording step when exposed to recording photoinitiating light. The wavelengths of the non-coherent photoinitiating light source and recording photoinitiating light source can be the same or different.

Since both matrix formation and hologram recording take place by a radical photopolymerization mechanism upon exposure to an appropriate photo-initiating light source, the components of the composition responsible for matrix formation and hologram recording are referred to collectively as the "photopolymerizable part". Accordingly, the photopolymerizable part comprises both a matrix forming component and a recording component.

The cross-link density of the polymer network can strongly influence the polymerization kinetics and consequently hologram formation. Both the molecular weight of the multifunctional radical photopolymerizable (meth)acrylic oligomer/monomer and the number of acrylate functional groups predetermine the cross-link density. It is known that a high functionality relates to a high polymerization rate and a high cross-link density, thereby reducing the extent of conversion of the monomer/oligomer into polymer.

In addition, a very high cross-link density can be an obstacle for the diffusion of recording monomer molecules during the hologram recording step. The viscous oligomeric liquid inert binder provides a means of regulating the cross-link density of the polymer network and a means of increasing the extent of double-bond conversion, and thereby allows the radically photopolymerizable mono-functional and/or di-functional recording component to have high polymerization conversion, enabling the recording of stable holograms with high dynamic range and high sensitivity.

One consequence of the use of an oligomeric liquid inert binder in the present invention is its effect on the refractive index contrast of the holograms. One method to provide high index contrast is to use an inert oligomeric binder that has moieties that are substantially different from, but compatible with the photopolymerizable part. For example, it has been found that high index contrast can be achieved by using a binder that has phenyl groups in combination with radical photopolymerizable (meth)acrylic oligomers having urethane acrylate groups and an ester- or ether-backbone.

Therefore, the present invention provides a composition for recording holograms comprising an inert polyphenyl ether binder capable of supporting radical polymerization, wherein the inert binder is substantially transparent in visible light, is viscous at room temperature; a photopolymerizable part comprising a matrix forming component comprising at least one radically photopolymerizable multifunctional (meth)acrylic oligomer or monomer, and a radically polymerizable mono- or difunctional recording component; and a photoinitiation system capable of initiating radical polymerization.

As used herein, the term "recording component" comprises, in one embodiment, the low molecular weight fraction of the multifunctional radical photopolymerizable (meth) acrylic oligomer/monomer (i.e., wherein the acrylate equivalent weight (AEW)$\leq$500 g/mol, and F is 1 or 2), and in another embodiment, the recording component comprises a mono- and/or di-functional monomer (wherein the functional equivalent weight$\leq$500 g/mol).

In one embodiment, the matrix forming component is a multifunctional (meth)acrylic oligomer or monomer having an acrylate equivalent weight (AEW) greater than or equal to about 600 g/mol, wherein the number of functional groups is at least 2, and the radically polymerizable recording component is a mono- or difunctional monomer having a functional equivalent weight (EW) of less than or equal to about 500 g/mol. The term "average acrylate equivalent weight" or "AEW", as used herein is the average molecular weight of the oligomer/monomer divided by the average number of acrylate groups per oligomer/monomer. The variable "F" refers to the number of functional groups present.

In one embodiment, the matrix forming component is a multifunctional (meth)acrylic oligomer or monomer having an average acrylate equivalent weight of from about 600 g/mol to about 1,500 g/mol, and the radically polymerizable mono- or difunctional recording component comprises a mono- or difunctional monomer having a functional equivalent weight (EW) of less than or equal to about 500 g/mol.

The present invention also relates to uses and applications of the hologram recording composition. In one embodiment, the composition of the invention is used in the manufacture of hologram recording media. One example of such a medium comprises an active photopolymer layer of the composition of the invention embraced by supporting glass or polymer plates, wherein at least one of the glass or polymer plates is transparent to visible light.

Due to high wavelength and angular selectivity, high dynamic range, high sensitivity of the holograms recorded in the medium of the present application, the holographic medium can be used for applications such as optical data storage, optical correlators, fiber optics communications (wavelength multiplexers and demultiplexers) and spectroscopy.

The desired performance characteristics of the composition are determined by the end use or application of the resulting medium. For example, due to high dynamic range and high sensitivity of the medium, very high data storage capacities and fast data rates are possible in optical data storage applications. A holographic medium with a thickness of 200 μm or greater allows the generation of holograms with narrow spectral and angular response, and may therefore be suitable for use in high-capacity holographic optical data storage systems or optical filters with a narrow spectral response or holographic lenses with high diffraction efficiency.

Description of Binders

The inert oligomeric liquid binder of the present invention is compatible with the photopolymerizable part, as well as with the polymeric products formed from polymerization of the photopolymerizable part. The oligomeric liquid binder provides a means of regulating the level of intermolecular interaction between the chains of the oligomeric liquid binder and the photopolymerizable (meth)acrylic oligomer/monomer, thereby providing an improved level of compatibility and reduced optical scattering.

Suitable oligomeric liquid binders are non-volatile and support (i.e., are inert to and do not interfere with) the radical photopolymerization of the (meth)acrylic oligomers/monomers and the recording component. The oligomeric liquid binder should have a high refractive index, high viscosity and high temperature boiling point. More specifically, the oligomeric liquid binder is selected to provide high refractive index contrast with the recording component, and optimal crosslink density of the resulting matrix, thereby providing high dynamic range and sensitivity.

Among the multitude of polyphenyl ethers, those which are suitable for the present invention are therefore substances that meet the requirements of an inert binder for a photopolymer medium. In other words, suitable polyphenyl ethers have one or more of the following properties: a viscous liquid at room temperature (typically from 20 to 25° C.); a refractive index that provides a high refractive index contrast with the recording component; long term stability; a relatively high molecular weight (between 400 g/mol and 3000 g/mol); and a high transparency at the spectral range of interest (typically from 400 nm to 750 nm, i.e, the visible spectrum).

In the present invention, the inert binder is an oligomeric polyphenyl ether. Polyphenyl ethers generally consist of phenyl groups joined by at least one oxygen atom. The general structure of a polyphenyl ether is shown as Formula 1:

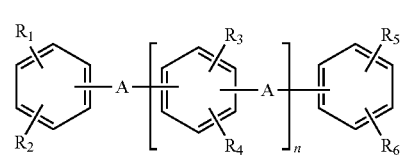

Formula 1 wherein A are atoms or radicals, where at least one such atom or radical is oxygen and the remainder of the atoms or radicals, which may be identical to or different from one another, including oxygen, sulfur and/or alkyl groups; where $R_1$, $R_2$, $R_3$, $R_4$, $R_5$ and $R_6$ may be identical to or different from one another, and which may include, but are not limited to: hydrogen, alkyl (e.g. methyl, isopropyl, butyl, tert-butyl, amyl, tert-amyl, etc.), alkoxy, phenyl, alkylphenyl, cycloalkyl, trifluoromethyl, halogen, hydroxyl, and alpha-cumyl; and where n is an integer that is an integer from 2 to 5. In addition to all the potential combinations of possible substituents, the rings of substituted or unsubstituted polyphenyl ethers may be connected via ortho-linkages, meta-linkages, para-linkages, or any combination thereof. [U.S. Pat. No. 3,321,403; R. C. Gunderson, A. W. Hart, (Eds.), "Synthetic Lubricants", Printed in USA, 1962, the disclosures of which are incorporated herein by reference].

The properties of a polyphenyl ether will vary according to factors such as the number of phenyl groups, the type and number of substituents, and the combinations of isomeric configurations present. For example, the isomer m-bis(m-phenoxyphenoxy)benzene, a five-ring polyphenyl ether (5P4E) of Formula 2:

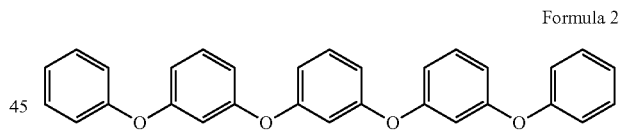

Formula 2 has a high melting point of 42.78° C., and therefore is not suitable for use in the present invention, by reason of requirements for handling and manufacturing at room temperature.

In general, the polyphenyl ethers are high-melting point compounds (i.e. solid at room temperature). Lower melting point polyphenyl ethers can be realized by using compounds comprising the following, individually or in combination: asymmetrical ether linkages; alkyl or other substituents on the phenyl rings; and/or a mixture of isomers.

The commercial products Santovac 5™, Santovac 5P Ultra™, and Santovac OS-124™ (all of which comprise five-ring polyphenyl ethers) are viscous liquids at room temperature. This is believed to be so at least in part because they are mixtures of up to eighteen isomeric compounds, resulting in a low melting point product. These products contain the meta-isomer, m-bis(m-phenoxyphenoxy)benzene, in the highest proportion.

Table 1 shows the chemical and trade names for some commercial and non-commercial unsubstituted polyphenyl ethers.

TABLE 1

Properties of some commercial and non-commercial polyphenyl ethers

| Common name | Trade name | Chemical name | Form at room temperature | Viscosity, cSt @38° C. |
|---|---|---|---|---|
| Seven-ring polyphenyl ether (7P6E) | Non commercial | m-Bis [m-(m-phenoxyphenoxy) phenoxy] benzene | Clear liquid | <10,000 |
| Six-ring polyphenyl ether (6P5E) | OS-138 | Bis[m-(m-phenoxyphenoxy)phenyl]ether | Clear liquid | 2550 |
| Five-ring polyphenyl ether (5P4E) | Santovac 5, 5P Ultra, and OS-124 | m-Bis(m-phenoxyphenoxy)benzene (name of isomer in highest proportion) | Clear liquid | 360 |
| Four-ring polyphenyl ether (4P3E) | MCS-210 | Bis(m-phenoxyphenyl)ether (name of isomer in highest proportion) | Clear liquid | 70 |

It is important to distinguish between compounds based on their refractive index, viscosity and molecular weight. In the case of unsubstituted polyphenyl ethers, viscosity and molecular weight grow as the number of phenyl rings in the molecule increases (see Table 1). For example, MCS-210 is a polyphenyl ether containing four rings having a molecular weight of 354 g/mol and its viscosity is 70 cSt at 38° C., while Santovac OS-138 is a polyphenyl ether containing six rings having a molecular weight of 540 g/mol, and its viscosity is 2550 cSt at 38° C.

Optimized viscosity and molecular weight of the inert binder, in combination with suitable photopolymerizable multifunctional (meth)acrylic oligomers/monomers, should be able to provide rigidity of the medium of the present invention while maintaining ability of the inert binder to diffuse from exposed regions to unexposed regions during recording.

In one embodiment, the binder has a viscosity of from about 70 cSt at 38° C. to about 10000 cSt at 38° C. In another embodiment, the binder has a viscosity of from about 100 cSt at 38° C. to about 8000 cSt at 38° C. In yet another embodiment, the binder has a viscosity of from about 150 cSt at 38° C. to about 5000 cSt at 38° C. In one embodiment, the binder has a viscosity of at least about 200 cSt at 38° C.

In one embodiment, the binder has molecular weight from 400 g/mol to 3000 g/mol.

Examples of oligomeric inert polyphenyl ether binders suitable for use in the present invention include the isomer bis[m-(m-phenoxyphenoxy)phenyl]ether (OS-138, 6P5E), or a mixture of isomers such as Santovac 5™. Also suitable for use in the present invention is an unsubstituted polyphenyl ether/thioether, Santolight™ 5267.

The chemical structure of the oligomeric liquid inert binder is such that the Flory-Huggins interaction parameter between the multifunctional radical photopolymerizable (meth)acrylic oligomer/monomer and the oligomeric liquid inert binder is relatively low. More specifically, the oligomeric liquid inert binder is substantially compatible with the oligomers/monomers and with the polymeric compound formed therefrom. This leads to reduced optical scattering. Compatibility can be at least partly determined by comparison of solubility parameters (see Table 2). If solubility parameters are unknown, chemical group contribution to cohesive energy density can be used.

TABLE 2

Solubility parameters and refractive index $n_D$ for photopolymerizable system components.

| Substance | $\delta$, $MPa^{1/2}$ | $n_D$ |
|---|---|---|
| Carbonate oligomers | 20-22 | 1.46-1.54 |
| Urethanes | 18-23 | 1.44-1.51 |
| Polyphenyl ether compounds | 20-23 | 1.49-1.67 |

The liquid inert binder, oligomers/monomers and polymeric compound are compatible, if the difference between solubility parameters of the inert binder and the multifunctional acrylate oligomers/monomers is less than 5.0 $MPa^{1/2}$. Compatibility is associated with intermolecular interactions between the multifunctional radical photopolymerizable (meth)acrylic oligomer or monomer and the inert oligomeric binder. For example, it is well known that there is an attractive interaction between molecules having a methyl ether group and phenyl ring, and molecules having urethane, ether and phenyl groups. It is therefore possible to promote compatibility with an inert binder containing phenyl and ether groups by selecting a multifunctional radical photopolymerizable (meth)acrylic oligomer/monomer with a structure having ester and/or ether backbones, and urethane or carbonate groups.

Figure 3:
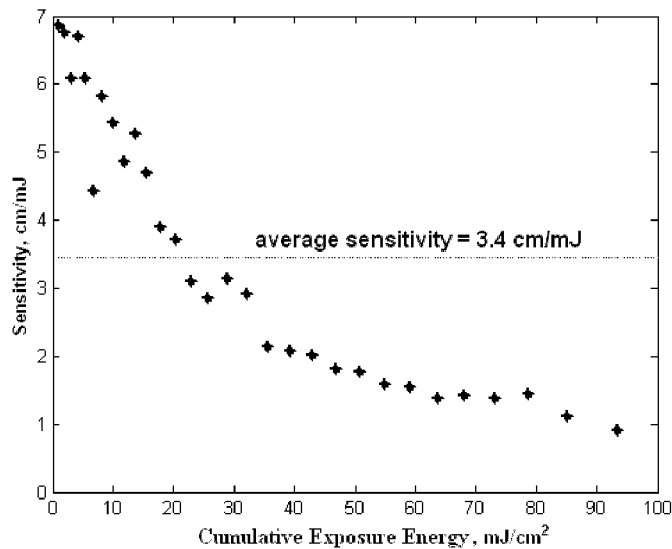
FIG. 3 is a plot of sensitivity values in cm/mJ versus the cumulative exposure energy in $mJ/cm^2$ as measured for a composition in accordance with one embodiment of the invention.

For the goals of the present invention, a commercially available alkyl substituted polyphenyl ether fluid, where R are alkyl groups with 8 to 24 carbon atoms in each (Santovac OS-105™) (FIG. 3) was tested. It was selected for testing because it has a solubility parameter similar to that of the multifunctional photopolymerizable (meth)acrylic oligomers used. In Santovac OS-105™, the alkyl groups are attached to the aromatic ring in a number of possible positions relative to the ether group.

It is insufficient for an oligomeric inert polyphenyl ether binder to merely have a solubility parameter similar to that of the multifunctional photopolymerizable (meth)acrylic oligomers used in the present invention because this does not guarantee compatibility with the matrix formed from the photopolymerizable oligomers/monomers. This is shown in Example 6, wherein the high degree of substitution in alkyl-substituted polyphenyl ether fluids (such as Santovac OS-105™) or the presence of long alkyl chains may limit this compatibility.

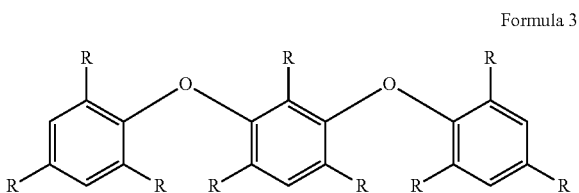

Formula 3

Accordingly, the skilled worker would readily appreciate that it is necessary to consider factors other than just solubility when identifying potential candidates suitable for use in the composition of the present invention.

Polyphenyl ether/thioethers may also be useful in the present invention. These compounds include polyphenyl ethers where one or more of the oxygen linkages have been replaced by a sulfur atom. Polyphenyl ether/thioethers have higher refractive indices than polyphenyl ethers. Examples of commercially available products are Santolight™ 5267 and 5262 from Santovac. Again, viscosity, refractive index and molecular weight can be adjusted by mixing different isomers and/or by varying substituents. Only such polyphenyl ether/thioethers as are viscous liquids at room temperature are useful for the present invention. The structure of an unsubstituted polyphenyl ether/thioether, Santolight™ 5267, is shown in Formula 4. This polyphenyl ether/thioether demonstrated good compatibility with multifunctional photopolymerizable (meth)acrylic oligomers, and holographic recording with high sensitivity and high dynamic range (see Example 2).

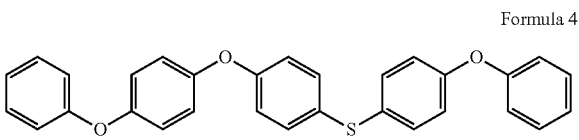 [SMILES: c1ccc(Oc2ccc(Oc3ccc(Sc4ccc(Oc5ccccc5)cc4)cc3)cc2)cc1]

Formula 4

Photopolymerizable Part

The composition of the present invention comprises a photopolymerizable part comprising a radical photopolymerizable (meth)acrylic oligomer having a low molecular weight fraction (functional equivalent weight (EW)≦500 g/mol, and F is 1 or 2) and high molecular weight fraction (acrylate equivalent weight (AEW)≧600 g/mol, and F≧2). Alternatively, the photopolymerizable part of the present invention comprises a mixture of a multifunctional radically photopolymerizable (meth)acrylic oligomer/monomer having an average acrylate equivalent weight preferably in the range of 600 g/mol to 1,500 g/mol, and a radically photopolymerizable mono- or difunctional recording monomer.

Description of Multifunctional Photopolymerizable (meth)acrylic Oligomers/Monomers The photopolymerizable (meth)acrylic oligomer/monomer suitable for matrix formation (and optionally for recording of holograms), can comprise an ether backbone, an ester backbone, or a combination of both. The multifunctional oligomer/monomer may also comprise urethane or carbonate groups, as well as phenyl groups, halogen substituents and sulfur atoms.

As used herein, the term "multifunctional", "difunctional" and "monofunctional" are used to refer to the number of functional groups present on a given oligomer/monomer that participate in the radical photopolymerization step, i.e., the number of functional groups which undergo cross-linking when exposed to an appropriate photo-initiating light source. In a composition according to the present invention, the functional group of interest is typically an acrylate, including but not limited to methacrylates, or any suitable functional group comprising a reactive vinyl group.

Multifunctional (meth)acrylic oligomer/monomer suitable for matrix formation have an average acrylate equivalent weight preferably in the range of about 600 g/mol to about 1,500 g/mol. In one embodiment of the invention, the multifunctional radical photopolymerizable (meth)acrylic oligomers or monomers of the present invention have (but are not limited to) from two to five functional groups, and an average acrylate equivalent weight preferably between the range of about 600 g/mol to about 1,500 g/mol. In one embodiment, the average acrylate equivalent weight of the multifunctional (meth)acrylic oligomers or monomers is from about 700 g/mol to about 900 g/mol. In one embodiment, the (meth)acrylic oligomers or monomers has two functional groups (i.e., F=2).

Such multifunctional oligomers or monomers participate in the creation of a cross-linked polymer network that acts as the matrix (support structure) in order to record stable holograms. The multifunctional (meth)acrylic oligomers/monomers having an acrylate equivalent weight in this range reduces cross-link density, thereby enabling a high dynamic range and a high sensitivity during hologram recording.

Highly flexible molecules containing ester and/or ether groups are desirable in the multifunctional radical photopolymerizable (meth)acrylic oligomers or monomers. The parameter that primarily determines the flexibility of the multifunctional radical photopolymerizable (meth)acrylic oligomers or monomers, is the presence of chemical groups with low potential energy barrier to molecular rotation, as exemplified by ether groups and ester groups, where the oxygen bridge (—O—) acts as a swivel [A. A. Berlin, G. V. Korolev, T. Ya. Kefeli, Y. M. Sivergin, "*Acrylic Oligomers and Materials Thereof*" (in Russian), Moscow 1983 pp 128; G. V. Korolev et al., "*Polyacrylate Networks: Micro heterogeneous Structures, Physical Networks, Deformation and Strength Properties*" Khimiya, Moscow, 1995 pp. 96-97, the disclosures of which are incorporated herein by reference]. It is well established that the more flexible an oligomer/monomer molecule is, the higher the conversion level. The conversion level is the degree of polymerization of the photopolymerizable oligomer/monomer, wherein a 100% conversion level occurs when all of the oligomer/monomer is polymerized. A higher conversion level leads to higher environmental stability of the media.

Both the molecular weight of the photopolymerizable multifunctional (meth)acrylic oligomers/monomers and the number of acrylate functional groups play an important role in determining the cross-link density of the medium of the present invention. It is known that the higher the degree of functionality of the photopolymerizable multifunctional (meth)acrylic oligomer/monomers, the higher the rate of polymerization, which results in an increasingly dense network, thereby reducing the extent of conversion. Too dense a network can be an obstacle to the diffusion of recording monomer and inert binder molecules during hologram formation. The value of functionality of photopolymerizable multifunctional (meth)acrylic oligomers/monomers is preferably from 2 to 5 (see Example 8) in order to provide the level of cross-link density that provides favorable conditions for diffusion of recording component and inert binder molecules during hologram formation.

The average acrylate equivalent weight of the photopolymerizable multifunctional (meth)acrylic oligomers/monomers determines the size of the segment between crosslink points of the network, and thereby influences the density of cross-linking. Among the family of urethane acrylate oligomers/monomers the preferable value of the average acrylate equivalent weight is higher than about 600 g/mol. Values of average acrylate equivalent weight less than about 600 g/mol lead to a more dense network which impedes recording component and inert binder molecules diffusion during hologram formation (see Example 7).

Multifunctional radically photopolymerizable (meth) acrylic oligomers/monomers vary widely in refractive index, molecular weight, viscosity, etc. Said parameters depend on the chemical structure, which strongly influences hologram properties. Optimization of the initial viscosity of the combination of photopolymerizable multifunctional (meth)acrylic oligomers/monomers, radically photopolymerizable mono- and/or di-functional recording component, and the oligomeric liquid inert binder is very important; a highly viscous composition will restrict the mobility of the photopolymerizable multifunctional (meth)acrylate monomers/oligomers and photopolymerizable mono- and/or di-functional recording component, while low viscosity composition impedes the stability of recorded holograms.

Non-limiting examples of suitable commercial multifunctional radical photopolymerizable (meth)acrylic oligomers are: CN965, CN964, CN2901, CN980, CN981, CN983, from Sartomer; PURELAST™ oligomers 566, 569, 586, 590 and 595; BR-582 from Bomar Specialties; EBECRYL™ 8800, EBECRYL™ 4842, EBECRYL™ 270 from UCB Chemicals Corporation; UVITHANE™ ZL-1178 oligomer from Morton Thiokol, Inc; and ALU-350 series resins, (i.e., 350, 351, 352, 353 and 354), from ECHO Resins. Non-limiting examples of suitable commercial multifunctional radical photopolymerizable (meth)acrylic monomers are: acrylated polyol Boltorn EO3000 from Perstorp Specialty Chemicals AB, and CN2303 from Sartomer.

It is known that oligomers are characterized by polydispersity in both molecular weight and in functionality (A. A. Berlin and N. G. Matvejeva, *Progress in the Chemistry of Polyreactive Oligomers and some Trends of its Development. II. Specific Features of Network Formation of Oligomers and properties of Network Polymers*, J. Polymer Sci.: Macromolecular Reviews, Vol. 15, 107-206 (1980, proper page 132)). Polydispersity of molecular weight is a measure of the distribution of molecular weight and polydispersity of functionality is a measure of the distribution of functionality in a given oligomer sample.

In one embodiment of the present invention, the oligomers used are characterized by the presence of low molecular weight and high molecular weight fractions, where preferably both fractions have low polydispersity of molecular weight (i.e. the molecular weight distribution is narrow). In the present invention it is preferred that the high molecular weight fraction of oligomer has high functionality and the low molecular weight fraction of oligomer has low functionality. Both molecular weight fractions should have low polydispersity enabling one fraction to construct the polymer network for the medium and the second fraction, acting as a recording component, to record holograms. Preferably, the higher molecular weight component is substantially consumed to form the polymer network for the media and the lower molecular weight component is substantially consumed for hologram recording.

Examples 1-6 demonstrate the results of hologram recording on a mixture of polyphenyl ether binder with urethane acrylate oligomers having different coefficients of polydispersity, Ip, for low molecular weight fractions. Aliphatic urethane acrylate oligomer CN 964 (from Sartomer), having an ester backbone, has a polydispersity of Ip=1.2 for the low molecular weight fraction, and aliphatic urethane acrylate oligomer CN981 (from Sartomer), having an ester/ether backbone, has a polydispersity of Ip=1.04 for the low molecular weight fraction (functional EW≦500 g/mol). The polydispersity values are obtained using a size-exclusion chromatography (SEC) method.

Description of Radical Photopolymerizable Mono-Functional and/or Di-Functional Recording Monomer The photopolymerizable mono- and/or di-functional recording component suitable for the present invention is characterized by molecular weight so that it does not restrict diffusive mobility during hologram recording. In one embodiment, the recording component comprises the low molecular weight fraction of the multifunctional radical photopolymerizable (meth)acrylic oligomer or monomer (i.e., wherein the acrylate equivalent weight (AEW)≦500 g/mol, and F is 1 or 2), as discussed above.

In another embodiment, the recording component comprises a mono- and/or di-functional recording monomer (wherein the functional equivalent weight (EW)≦500 g/mol).

In one embodiment of the present invention, the photopolymerizable part consists of multifunctional (meth)acrylic oligomer/monomer substantially consumed for matrix creation and a recording monomer substantially consumed for hologram formation (see Example 10).

In each case, the recording component is compatible with the liquid inert binder and with multifunctional (meth)acrylic oligomer/monomer before and after hologram recording, thereby minimizing light scattering.

Accordingly, in the present invention, the radically photopolymerizable mono- and/or di-functional recording monomers can be, but are not limited to, molecules containing ethylenic unsaturation such as methacrylamides, acrylamides, styrene, substituted styrenes, vinyl naphthalene, substituted vinyl naphthalenes, or other vinyl derivatives. For example, radically photopolymerizable monomers useful for the present invention include, but are not limited to, tetraethylene glycol diacrylate (TTEGDA), neopentyl glycol methyl ether propoxylate (2PO/OH)acrylate, diethylene glycol methyl ether acrylate; N-vinylcarbazole, 4-(1-Propenyloxymethyl)-1,3-dioxolan-2-one, isobornyl acrylate, ethylene glycol dicyclopentenyl ether methacrylate, ethylene glycol dicyclopentenyl ether acrylate, 2-phenoxyethylacrylate, and 4-acryloyl morpholine.

In one embodiment, the recording monomer is 4-acryloyl morpholine.

Photoinitiator

In addition to the multifunctional radical photopolymerizable (meth)acrylic oligomers or monomers, the radically photopolymerizable mono-functional and/or di-functional recording component, and the liquid inert binder, the composition of the present invention contains a photoinitiation system. As used herein, the term "photoinitiation system", when used to refer to the holographic recording medium of the present invention, means a photoinitiator and co-initiator; a photoinitiator, co-initiator and sensitizer; sensitizer and co-initiator; or a photoinitiator.

A variety of photoinitiators that could initiate radical photopolymerization in the visible range of wavelength spectra are commercially available and suitable for the present invention. The following is a non-limiting list of free radical photoinitiators suitable for use in the present invention:

a) bis($\eta^{-5}$-2,4 cyclopentadien-1-yl)bis[2,6-difluoro-3-(1H-pyrrol-1-yl)phenyl]titanium, available from Ciba as Irgacure 784™, which is suitable for photoinitiation by a green or blue laser;
b) bis(2,6-difluorophenyl)bis[1,2,3,4,5-eta)-1-methyl-2,4-cyclopentadien-1-yl]-titanium, available from Ciba as Irgacure 727 L™, which is suitable for photoinitiation by a green or blue laser;
c) Irgacure 369™, Irgacure 819™, and Irgacure 907™, Irgacure OXE01™, which are suitable for photoinitiation by a blue laser.

A photoinitiator that requires a co-initiator can also be used, such as 5,7-diiodo-3-butoxy-6-fluorone (commercial name H-Nu 470) and 2,4,5,7-tetraiodo-3-hydroxy-6-fluorone (commercial name H-Nu 535), available from Spectra Group Limited.

Examples of suitable sensitizers include xanthene dyes (eosin, rose Bengal, erythrosine) and methylene blue. Different amines (triethanolamine, n-methyl diethanol amine) or mercaptans can be used as co-initiators.

Optional Retarder/Inhibitor

The holographic recording medium of the present invention optionally comprises elements that control the radical polymerization. Control of polymerization of the recording component after matrix preparation (when not exposed to photo-initiating light source) is achieved by including in the composition a polymerization retarder or inhibitor, or a chain transfer agent.

These may include phenolic derivatives such as trans-4-hydroxystilbene, coniferyl aldehyde (hydroxy-3-methoxy-cinnamaldehyde), sinapic acid (3,5-dimethoxy-4-hydroxy-cinnamic acid), syringaldehyde (3,5-dimethoxy-4-hydroxybenzaldehyde), syringic acid (3,5-dimethoxy-4-hydroxybenzoic acid), vanillin (4-hydroxy-3-methoxybenzaldehyde), flavone (2-phenyl-4H-1-benzopyran-4-one), morin (2',3,4',5,7-pentahydroxyflavone), quercetine, catechine [(−)-trans-3,3',4',5,7-pentahydroxyflavane], gallic acid (3,4,5-trihydroxybenzoic acid), ellagic acid (4,4',5,5',6,6'-hexahydroxydiphenic acid), which are described in F. Mauguiere-Guyonnet et al., "On the Inhibiting Effect of Phenolic Compounds in the Photopolymerization of Acrylates under High-Intensity and Polychromic UV/Visible lights", *J. Appl. Polym. Sci.*, v. 103, pp. 3285-3298 (2007), the disclosure of which is incorporated herein by reference.

Suitable polymerization retarders and inhibitors of free radical polymerization may also include different nitrobenzenes, such as o-dinitrobenzene, p-dinitrobenzene, m-dinitrobenzene; different amines including triethylamine, N,N-dimethylbenzylamine, N-phenyl-1-naphthylamine, N-phenyl-2-naphthylamine, p-nitrosamine; and aniline and hindered anilines, such as 2,6-diisopropyl-N,N-dimethylaniline, 4-tert-butyl-N,N-dimethylaniline, N,N,2,4,6-pentamethylaniline, 4-dimethylaminotoluene; all of which are suitable for the present invention.

Other examples of suitable polymerization retarders and inhibitors of free radical polymerization for use in the present invention include, but are not limited to, 2,6-di-t-butyl-p-cresol (BHT), p-methoxyphenol, diphenyl-p-benzoquinone, benzoquinone, hydroquinone, pyrogallol, resorcinol, benzylaminophenol, p-dihydroxybenzene, 2,4,6-trimethylphenol, and chloranil.

The holographic recording medium of the present invention may optionally contain additives for improvement of compatibility of components or for ease of manufacture. These additives are surfactants, wetting agent(s), agent(s) for discoloration, antioxidants, stabilizers or other additives, for improvement in light scattering and improvement in media fabrication.

The proportions of photoinitiation system, liquid inert binder and multifunctional radical photopolymerizable (meth)acrylic oligomer and monomers in the holographic recording medium of the present invention may vary rather widely and the optimum proportions for specific components and methods of use can readily be determined empirically by those skilled in the art.

The proportion of the photopolymerizable part of the composition of the present invention, relative to the liquid inert binder, can range from about 90 parts binder and 10 parts photopolymerizable part (w/w) to about 10 parts binder and 90 parts photopolymerizable part (w/w). In one embodiment, the proportion of the photopolymerizable part (w/w) to that of the binder is in a range from about 75 part binder and 25 part photopolymerizable part (w/w) to about 40 parts binder and 60 parts photopolymerizable part (w/w).

The photopolymerizable part of the holographic recording medium of the present invention, contains X % radical photopolymerizable monomer, and about Y % multifunctional (meth)acrylic oligomer/monomer, where X is in the range 2% to 30% (w/w) and Y is 100%-X (w/w). In one embodiment, the photopolymerizable part of the holographic recording medium X is in the range 5 to 25% (w/w) and Y is 100%-X (w/w).

A weight ratio of the retarders or inhibitors to the photopolymerizable part is in the range of 0.1%:99.9% to 10%:90% and preferably in the range of 0.5%:99.5% (w/w) to 5%:95% (w/w).

A weight ratio of the photoinitiation system to the photopolymerizable part is in the range of 0.1%:99.9% to 10%:90% and preferably in the range of 0.5%:99.5% (w/w) to 2%:98% (w/w).

Below are provided non-limiting illustrative examples of various embodiments of the invention.

EXAMPLES

In the examples below, the following setup and medium preparation method was used:

The medium was prepared in a manner so as to avoid exposure to photoinitiating light. A mechanical stirrer was used to mix all of the components together into a homogenous mixture. The mixing was continued for more than 24 hours, after which the mixture was filtered through a 0.2 μm porous glass filter and left undisturbed in order allow the air bubbles to degas from the media. The absence of air bubbles was verified by use of an optical microscope. The mixture was then sandwiched between two borosilicate glass substrates having flatness of λ/10. Precision spacers were used to regulate the parallelism of the glass plates and to ensure a thickness of the medium greater than 200 μm.

Holograms were then recorded using a plane-wave holographic setup. Two linearly polarized coherent beams with 25 mm width and equal intensity obtained from a CW Argon ion laser (operating at 514 nm) were crossed in the medium to form a spatial intensity modulation. The angle between the beams in air was 40 degrees. The diffracted and transmitted intensities were monitored in real-time with a He—Ne laser operating at 632.8 nm.

The sandwiched medium was rotated along a central axis and angular selectivity curves for single and multiplexed holograms were obtained at 0.01 degree intervals.

The polydispersity is measured using a size-exclusion chromatography (SEC) method.

The dynamic range of a holographic medium is characterized by M# (M-number) that is calculated using the equation:

$$M\# = \sum_i \sqrt{\eta_i}$$

where $\eta_i$ is the maximum diffraction efficiency of i-th hologram and diffraction efficiency is measured as a ratio of the intensity of diffracted beam to the intensity sum of diffracted and transmitted beams.

Example 1

The following example shows the use of a multifunctional oligomer urethane based on an ester backbone with an average AEW in the range of 600 g/mol to 1,500 g/mol with a binder having an unsubstituted polyphenyl ether structure.

A mixture of the oligomer urethane diacrylate CN964 (Sartomer), the binder Santovac 5 and Irgacure 784 was stirred for about 24 hours. The concentration of Irgacure 784 in the CN964 was 0.75%. The ratio between the Irgacure 784:CN964 mixture and Santovac 5 was 40/60 (w/w). Recorded holograms were characterized by high diffraction efficiency ($\eta$=97%) for a thickness of at least 200 µm. Samples of the exposed mixture were kept at 80° C. for 24 hours and no change was observed in diffraction efficiency or angular selectivity curves.

The hologram recorded samples remained clear and transparent at visible light indicating that a composition of oligomer urethane diacrylate based on an ester backbone and a binder having an unsubstituted polyphenyl ether structure has good compatibility and enables the recording of stable holograms with high diffraction efficiency.

Example 2

The following example shows the use of polyphenyl ether/thioether as a binder.

Irgacure 784 was added to aliphatic urethane diacrylate oligomer CN964 (1% Irgacure: 99% CN964). CN964 has an average molecular weight of $\overline{M}_W$=1,500. The Irgacure 784:CN964 mixture was then mixed with the binder polyphenyl ether/thioether (Santolight 5267 with viscosity 100 cSt @38° C.). The ratio between the Irgacure 784:CN964 mixture and Santolight 5257 was 40/60 (w/w). Holograms with a diffraction efficiency of 33% were recorded on samples having a thickness of at least 200 µm. The holographic medium remained clear and transparent at visible light.

This demonstrates that the use of polyphenyl ether/thioether can be used as a binder in the present invention.

Example 3

The following example shows the use of oligomer urethane diacrylate based on an ester backbone with unsubstituted polyphenyl ether structure for recording multiplexed holograms (indicative of a high dynamic range).

Chromatography measurements were performed on urethane diacrylate oligomer CN964 (see FIG. 1). The results show the presence of two oligomeric fractions: a low molecular weight fraction and a high molecular weight fraction. The low molecular fraction is characterized by polydispersity of $I_p$=1.2 ($\overline{M}_W$=650 g/mol). A 1% mixture of Irgacure 784 in the oligomer CN964 (3.1233 g) was thoroughly mixed with Santovac OS138 (4.7266 g) for 24 hours using a mechanical stirrer.

Holograms with a very high diffraction efficiency $\eta$=95% were recorded in the media. The hologram recorded samples remained clear and transparent at visible light indicating good compatibility between oligomer urethane diacrylate based on an ester backbone and unsubstituted 6-ring polyphenyl ether binder. Angular multiplexing was performed on the resulting media to determine its dynamic range. An exposure schedule was used for multiplexing up to 50 holograms. The recording of multiplexed holograms showed an M-number of 2.6.

This example demonstrates that a composition of oligomer urethane diacrylate based on an ester backbone with unsubstituted polyphenyl ether structure produces a medium with high dynamic range and that is suitable for recording stable holograms.

Example 4

The following example shows the use of oligomer urethane diacrylate based on an ester/ether backbone with unsubstituted polyphenyl ether structure for recording of multiplexed holograms (indicative of a high dynamic range).

The aliphatic urethane acrylate oligomer CN981 has an average AEW of 800-900 g/mol, and a functionality of F=2. Chromatographic results show the presence of two oligomeric fractions: a low molecular weight fraction and a high molecular weight fraction. The low molecular weight fraction is characterized by a polydispersity of $I_p$=1.04 ($\overline{M}_W$=740 g/mol). A 1% mixture of Irgacure 784 in CN981 (8.159 g) was thoroughly mixed with Santovac 5 (8.1692 g) for 24 hours using a mechanical stirrer.

Figure 2:
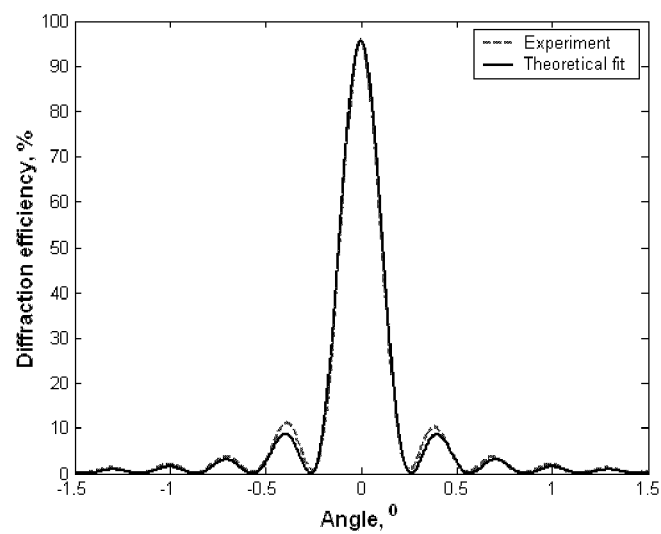
FIG. 2 is a plot of diffraction efficiency (%) versus the angle as measured for a composition in accordance with one embodiment of the invention.
Figure 4:
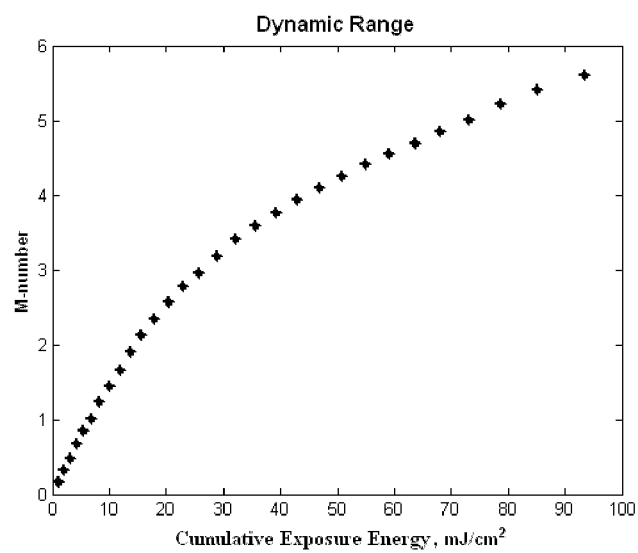
FIG. 4 is a plot of M-number values versus the cumulative exposure energy in $mJ/cm^2$ as measured for a composition in accordance with one embodiment of the invention.

Holograms with a very high diffraction efficiency $\eta$=97% (FIG. 2) were recorded in the media. The holographic medium remained clear and transparent at visible light indicating good compatibility between a urethane diacrylate oligomer based on an ester/ether backbone and an unsubstituted 5-ring polyphenyl ether binder. Angular multiplexing was performed on the resulting media to determine its dynamic range. An exposure schedule was used for multiplexing up to 30 holograms. The recording of multiplexed holograms showed an average sensitivity of 3.4 cm/mJ (FIG. 3), and an M-number greater than 5 (FIG. 4).

This example demonstrates that a composition of urethane diacrylate oligomer based on an ester/ether backbone with an unsubstituted polyphenyl ether binder produces a medium with a high dynamic range and that is suitable for recording of stable holograms with excellent diffraction efficiency.

Example 5

The following example shows the use of a retarder in the medium with a urethane diacrylate oligomer based on an ester/ether backbone and an unsubstituted polyphenyl ether binder to control the rate of polymerization of the recording component after matrix preparation.

A composition containing 48.4% (wt) CN981, 0.5% (wt) Irgacure 784, 48.5% (wt) Santovac 5, and 2.6% (wt) 2,6-di-t-butyl-p-cresol (as retarder), was used for polymerization control and holographic recording. The samples were partially polymerized using a non-coherent photoinitiating light source in order to create a matrix and stored at room temperature in darkness until their use in holographic recording. The recorded holograms were stable with high diffraction efficiency (more than 90%) regardless of shelf life time of tested (from 1 hour up to 150 hours) partially polymerized samples.

Example 6

Irgacure 784 was mixed with aliphatic urethane diacrylate oligomer CN981 in a 1% Irgacure 784:99% aliphatic urethane diacrylate oligomer ratio. The mixture was then combined with the binder Santovac OS-105™ in a ratio of 50/50 (w/w).

Even though the binder has a solubility parameter similar to that of the oligomer used, and it has viscosity in the desired range, the system demonstrated incompatibility (the material turned opaque, or milky white) and phase separation after polymerization. It is believed that long alkyl groups in the binder hinder intermolecular interaction between the polyphenyl ether molecules and the urethane acrylate oligomer/polymer molecules, leading to non-compatibility.

Example 7

The following example shows the use of oligomers with average AEW of less than 600 g/mol.

Urethane diacrylate oligomer CN983 (Sartomer) has an average AEW of less than 600 g/mol. Santovac 5 (5.23 g) and Irgacure 784 (0.03 g) was added to CN983 (3.31 g). Holograms recorded in samples of the mixture having a thickness of at least 200 μm were characterized by sensitivity of 20 mJ/cm$^2$ and diffraction efficiency of 60%.

Oscillations in the measured angular selectivity curve indicated a high degree of refractive index inhomogeneities throughout the volume of the medium.

It is believed that the low AEW of this oligomer makes it not suitable for the present invention because it creates a dense polymer network impeding efficient diffusion and it encourages inhomogeneities in the medium.

Example 8

The following example shows the use of highly functional (i.e. greater than F=5) oligomers with average AEW less than 600 g/mol are not suitable for the present holographic medium.

Urethane acrylate oligomer (CN975 from Sartomer) has average functionality of F=6 and AEW of 300 g/mol. Santovac 5™ (7.21 g) and Irgacure 784 (0.05 g) was added to CN975 (5.17 g) and mixed.

Holograms recorded in samples of the mixture having a thickness of at least 200 μm were characterized by low diffraction efficiency of 4%. This is believed to be a result of high functionality with a low AEW creating a highly cross linked network that impedes diffusion of components of the mixture during hologram recording.

Example 9

The following example shows the use of urethane tri-acrylate oligomer based on an ester backbone with unsubstituted polyphenyl ether structure for recording of multiplexed holograms (indicative of a high dynamic range).

The aromatic urethane tri-acrylate oligomer CN2901 is characterized by an average AEW greater than 600 g/mol and a functionality of F=3. A 0.75% mixture of Irgacure 784 in CN2901 (1.93 g) was mixed with Santovac OS138 (2.89 g) for 24 hours using a mechanical stirrer. Holograms recorded in the samples were found to have diffraction efficiency of 60%, however, oscillations in the measured angular selectivity curve indicated a high degree of inhomogeneity throughout the volume of the medium. Chromatographic measurements of the samples showed the presence of many fractions in the oligomer.

This example demonstrates that a urethane tri-acrylate oligomer based on an ester backbone with unsubstituted polyphenyl ether structure has a good compatibility of components (the sample remained clear and transparent at visible light) and good diffraction efficiency, but is not suitable for recording of uniform holograms due to high degree of grating (refractive index modulation) inhomogeneity throughout the volume of the medium arising from a high molecular weight polydispersity in the tri-acrylate oligomer.

Example 10

The following example shows the use of a multi-functional monomer and a mono-functional monomer with an unsubstituted polyphenyl ether binder. Initially, the hologram recorded samples show high diffraction efficiency and the samples remained clear and transparent indicating good compatibility between components after polymerization. However, after 6 months storage at room temperature in darkness the recorded samples show poor mechanical properties. The observed poor mechanical properties of the recorded samples are likely due to low AEW (<600 g/mol) and high functionality (F>5) of the multi-functional monomer. In addition, as the samples were prepared without hermetic sealing, it is possible that humidity and oxygen have contributed to observed long term instability.

The acrylated polyol, Boltorn EO3000, is used as a multi-functional monomer. The mono-functional monomer 4-acryloyl morpholine (from Aldrich) with a molecular weight of 141 g/mol is used as a recording monomer. The holographic recording medium contains 60% (wt) Santovac 5, 28% (wt) Boltorn EO3000, 11.6% (wt) 4-acryloyl morpholine, and 0.4% (wt) Irgacure 784.

400 μm thick samples were tested and remained clear and transparent (light scattering is low, about $10^{-6}$ μm$^{-1}$·Srad$^{-1}$) when the medium is fully polymerized by a non-coherent photoinitiating light source. Holograms with a high diffraction efficiency η=95% were recorded in the medium. Poor mechanical properties are observed in the samples after 6 month storage at room temperature in darkness.

For applications where long term mechanical stability is crucial, this composition is not acceptable. However, for some applications this composition is useful, for example in a hologram replication process, wherein a master hologram can be recorded using this composition.

The embodiments of the invention for which an exclusive property or privilege is claimed are defined as follows:
1. A composition for holographic recording comprising:
    a) an inert polyphenyl ether binder capable of supporting radical polymerization, wherein the polyphenyl ether binder comprises an unsubstituted polyphenyl ether having 5 or 6 phenyl groups having at least one thioether linkage, and
    wherein the inert binder is substantially transparent in visible light, and is viscous at room temperature;
    b) a photopolymerizable part comprising:
        i. a matrix forming component comprising at least one radically photopolymerizable multifunctional (meth) acrylic oligomer or monomer, and
        ii. a radically polymerizable recording component; and
    c) a photoinitiation system capable of initiating radical polymerization.

2. The composition of claim 1, wherein the matrix forming component comprises a multifunctional (meth)acrylic oligomer or monomer having an acrylate equivalent weight (AEW) greater than or equal to 600 g/mol, wherein the number of functional groups is at least 2, and the recording component comprises a radically polymerizable mono- or difunctional (meth)acrylic monomer and/or oligomer having a functional equivalent weight (EW) of less than or equal to about 500 g/mol.

3. The composition of claim 1, wherein the matrix forming component comprises a multifunctional (meth)acrylic oligomer and/or monomer, having an average acrylate equivalent weight of from about 600 g/mol to about 1,500 g/mol, and the recording component comprises a radically polymerizable mono- or difunctional recording monomer having a functional equivalent weight (EW) of less than or equal to about 500 g/mol.

4. The composition of claim 1, wherein the binder has a viscosity of at least about 200 cSt at 380° C.

5. The composition of claim 1, wherein the multifunctional (meth)acrylic oligomer comprises an ester backbone, an ether backbone or a combination thereof.

6. The composition of claim 1, wherein the multifunctional (meth)acrylic oligomer is a urethane acrylate.

7. The composition of claim 1, wherein the multifunctional (meth)acrylic oligomer is a urethane (meth)acrylate.

8. The composition of claim 1, wherein the recording component comprises a recording monomer selected from the group consisting of tetraethylene glycol diacrylate (TTEGDA), neopentyl glycol methyl ether propoxylate (2PO/OH)acrylate, diethylene glycol methyl ether acrylate, N-vinylcarbazole, 4-(1-propenyloxymethyl)-1,3-dioxolan-2-one, isobornyl acrylate, ethylene glycol dicyclopentenyl ether methacrylate, ethylene glycol dicyclopentenyl ether acrylate, 2-phenoxyethylacrylate, and 4-acryloyl morpholine.

9. The holographic recording medium of claim 8, wherein the active photopolymer layer has a thickness of at least about 200 microns.

10. The composition of claim 1, wherein the binder has a refractive index different from the refractive index of the mono and/or difunctional recording monomer by at least 0.02.

11. The composition of claim 1, wherein the photoinitiation system comprises at least one photoinitiator and/or sensitizer and/or coinitiator.

12. The composition of claim 1, further comprising at least one polymerization retarder or polymerization inhibitor.

13. The composition of claim 1, further comprising surfactants, wetting agents, agents for discoloration, antioxidants, and stabilizers.

14. The composition of claim 1, comprising from about 90 parts binder and 10 parts oligomer/monomer (w/w) to about 10 parts binder and 90 parts oligomer/monomer (w/w).

15. The composition of claim 1, comprising from about 0.5 parts by weight mono- and di-functional recording monomer to about 10 parts by weight of the multifunctional oligomer/monomer.

16. A holographic recording medium comprising an active photopolymer layer comprising the composition as defined in claim 1, wherein the photopolymer layer is embraced by supporting glass or polymer plates, wherein at least one of the glass or polymer plates is transparent to visible light.

17. Process for preparing a medium suitable for hologram recording, comprising the steps of:
   a) combining an inert polyphenyl ether binder capable of supporting radical polymerization, wherein the polyphenyl ether binder comprises an unsubstituted polyphenyl ether having 5 or 6 phenyl groups having at least one thioether linkage, and wherein the inert binder is substantially transparent in visible light, and is viscous at room temperature; a photopolymerizable part comprising a matrix forming component comprising at least one radically photopolymerizable multifunctional (meth)acrylic oligomer or monomer, and a recording component comprising a radically polymerizable mono- and/or difunctional recording monomer; and a photoinitiation system capable of initiating radical polymerization to obtain a reaction mixture; and
   b) exposing the reaction mixture obtained in step a) to a non-coherent photoinitiating light source to initiate matrix formation.

18. The process according to claim 17, wherein the reaction mixture of step a) additionally comprises a polymerization retarder or a polymerization inhibitor.

* * * * *

UNITED STATES PATENT AND TRADEMARK OFFICE
CERTIFICATE OF CORRECTION

PATENT NO. : 8,435,701 B2  Page 1 of 1
APPLICATION NO. : 12/745241
DATED : May 7, 2013
INVENTOR(S) : Peredereeva et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this
Eighth Day of September, 2015

Michelle K. Lee
*Director of the United States Patent and Trademark Office*